D. H. TÊTU.
Fish-Drier.
No. 207,913. Patented Sept. 10, 1878.
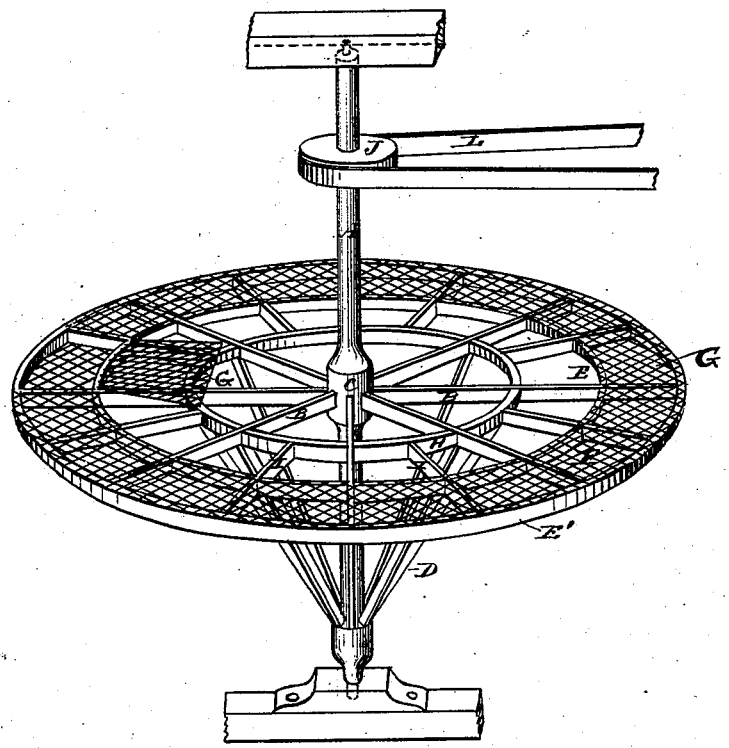

UNITED STATES PATENT OFFICE.

DAVID H. TÊTU, OF SOUTH POINT, QUEBEC, CANADA.

IMPROVEMENT IN FISH-DRIERS.

Specification forming part of Letters Patent No. 207,913, dated September 10, 1878; application filed June 17, 1878.

*To all whom it may concern:*

Be it known that I, DAVID HENRI TÊTU, of South Point, in the Island of Anticosti, in the Province of Quebec, Canada, have invented a certain new and useful Improvement in the Art of Drying Fish, &c.; and I do hereby declare that the following is a full, clear, and exact description of the same.

The object of this invention is to facilitate the drying of fish and other food for preservation; and it consists of a revolving frame composed of one or more wheel-like tables, the two outer rings of each table having at the bottom a net-work on which to place the fish, and a corresponding covering of net-work, in sections, at the top to overlie and retain the fish, &c., during the rotation of the frame, the sectional form of the cover admitting of the fish being removed from any portion of the frame without disturbing that in any other portion. The wheel-like frame is supported by converging arms radiating from a vertical spindle and by a central ring supported by outwardly-extending props.

The drawing represents a perspective view of my drying-frame.

A is a vertical spindle-shaft, suitably stepped. B are radial arms inserted in a hub, C, on the spindle A. D are props supporting the outer ends of the arms from the spindle A. E E' are an inner and an outer circumferential ring at and near the extremities of the arms. F is a net-work at the bottom of the rings E E', and on which the fish, &c., to be dried is placed flatwise. G is a net-work, in sections, secured to one of the rings, and attachable to the other, to cover the fish, &c., when laid on the net-work F, and keep the fish in place during the revolution of the wheel.

The net-work allows the moisture to readily escape. The net-work may be of open-work, of any suitable structure or material.

The net-work G is, preferably, of coarser material than the net-work F. H is a ring secured to the arms B, and I are arms extending from the ring H to the rings E E', to give the net-work additional rigidity. J is a pulley, and L a belt, driven by steam, wind, animal, or other convenient motive power, for revolving the drying-frame.

The fish, &c., after being split or salted, is laid on the net-work F flatwise and covered by the coarser nets G, and the structure is then rotated at a speed to be regulated according to circumstances. The rotation creates a current of air, which rapidly causes or helps the fish, &c., to dry.

This mode of drying fish, &c., can be carried on under a roof or within a building without artificial heat during the foggy season.

Fish dried by my method will neither be fly-blown and afterward become maggoty, nor be sun-burnt, and its market value lessened, nor be salt-burnt and be valueless, and a saving of salt is effected by fishermen being enabled to dry fish soon after being salted; and oily fish can be saved by being dried without being salted.

I am aware that apparatus for drying agricultural products have already been constructed of wheel-like form, and having compartments or divisions in the center for the reception of such articles; and I am also aware that it is not new to cover the top and bottom of such compartments with wire-work. Such construction I do not claim; but What I do claim, and desire to secure by Letters Patent, is—

A horizontally-revolving drier composed of a revolving wheel having two outer rings, which are divided into compartments, said compartments having reticulated bottom and top, the top portion being hinged or otherwise adapted to fold over in sections, and the whole wheel being supported from the bottom of a vertical spindle by radiating props, and from the side of the vertical spindle by radiating arms, substantially as set forth.

DAVID H. TÊTU.

Witnesses:
JOHN GRIST,
F. J. ROSS.